United States Patent
Kim et al.

(10) Patent No.: US 8,369,395 B2
(45) Date of Patent: Feb. 5, 2013

(54) PORTABLE APPARATUS AND METHOD OF MEASURING WIRELESS CHANNEL AND MULTIPLE ANTENNA CORRELATION

(75) Inventors: Myung Don Kim, Daejeon (KR); Jae Joon Park, Daejeon (KR); Won Sop Kim, Jeonju-si (KR); Young-Hoon Kim, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 647 days.

(21) Appl. No.: 12/557,393

(22) Filed: Sep. 10, 2009

(65) Prior Publication Data

US 2010/0158088 A1 Jun. 24, 2010

(30) Foreign Application Priority Data

Dec. 19, 2008 (KR) .................. 10-2008-0129865

(51) Int. Cl.
*H04B 3/46* (2006.01)
*H04B 7/10* (2006.01)
(52) U.S. Cl. ............... 375/224; 375/347; 455/67.11
(58) Field of Classification Search .......... 375/224, 375/347, 346, 316; 455/67.11
See application file for complete search history.

(56) References Cited

U.S. PATENT DOCUMENTS

| 5,748,314 | A | 5/1998 | Kitayoshi | |
|---|---|---|---|---|
| 2006/0193339 | A1* | 8/2006 | Wang et al. | 370/465 |
| 2007/0167142 | A1* | 7/2007 | Kim et al. | 455/101 |
| 2008/0212520 | A1* | 9/2008 | Chen et al. | 370/320 |
| 2010/0150266 | A1* | 6/2010 | Mondal et al. | 375/296 |
| 2010/0322328 | A1* | 12/2010 | Schirmacher et al. | 375/260 |

FOREIGN PATENT DOCUMENTS

| KR | 10-2003-0015963 A | 2/2003 |
|---|---|---|
| KR | 10-2004-0075730 A | 8/2004 |
| KR | 10-2005-0117127 A | 12/2005 |
| KR | 10-2008-0048351 A | 6/2008 |
| KR | 10-2008-0055398 A | 6/2008 |

\* cited by examiner

*Primary Examiner* — David C. Payne
*Assistant Examiner* — Brian J Stevens
(74) *Attorney, Agent, or Firm* — Kile Park Goekjian Reed & McManus PLLC

(57) ABSTRACT

A portable apparatus including: a Radio Frequency (RF) unit to control a frequency of a signal to be measured, to broadcast the signal to be measured through multiple transmission antennas, to control a frequency of a received signal, and to send the received signal to the baseband unit, the received signal being received through multiple receiving antennas; and a baseband unit to generate and transmit, to the RF unit, the signal to be measured, to measure wireless channels for each of the multiple transmission antennas and wireless channels for each of the multiple receiving antennas based on the received signal output from the RF unit, to calculate a correlation for each of the multiple transmission antennas, and to calculate a correlation for each of the multiple receiving antennas based on the wireless channels for each of the multiple transmission and receiving antennas.

14 Claims, 5 Drawing Sheets

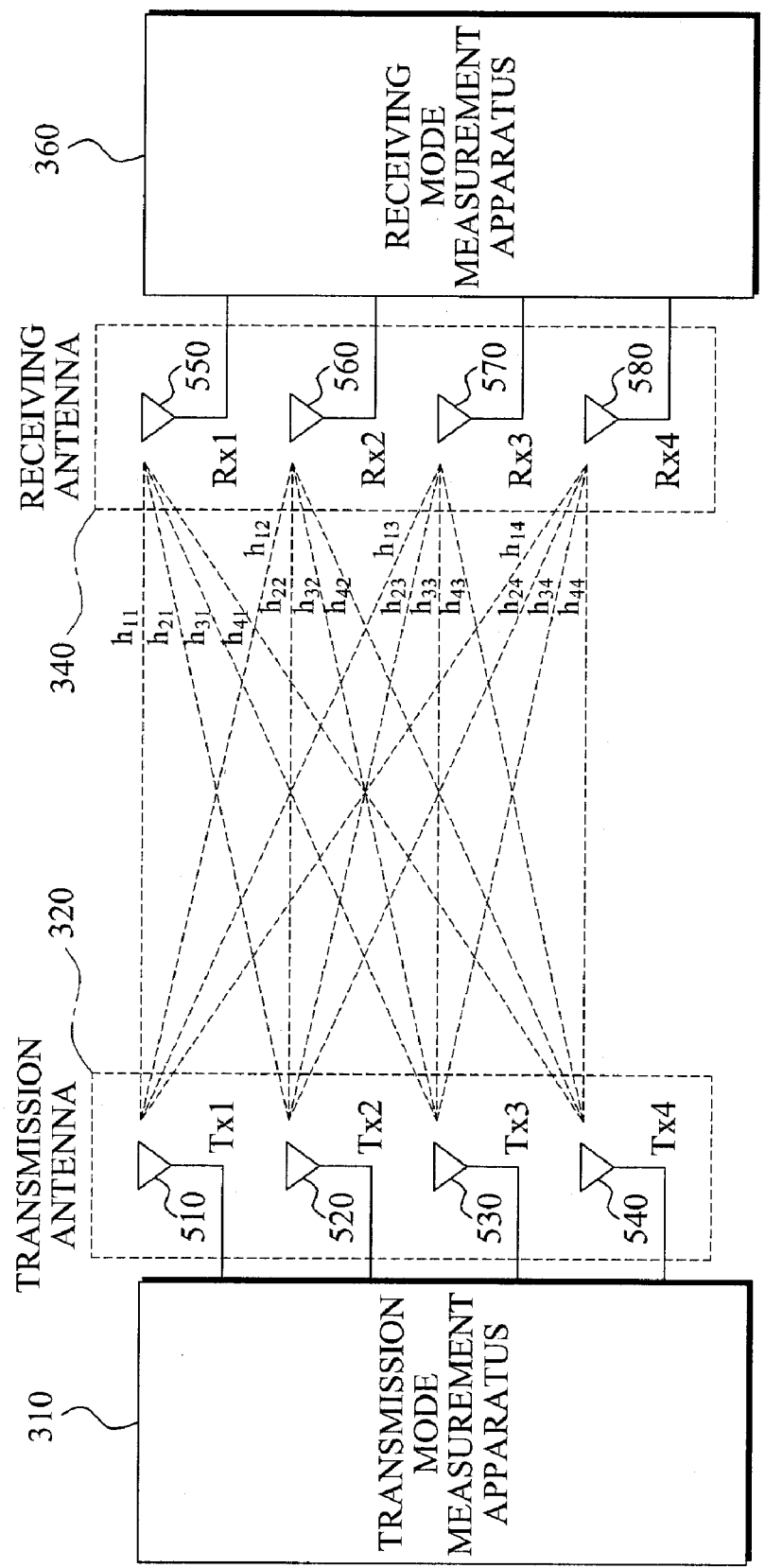

PORTABLE APPARATUS AND METHOD OF MEASURING WIRELESS CHANNEL AND MULTIPLE ANTENNA CORRELATION

CROSS-REFERENCE TO RELATED APPLICATION

This application claims the benefit of Korean Patent Application No. 10-2008-0129865, filed on Dec. 19, 2008, in the Korean Intellectual Property Office, the disclosure of which is incorporated herein by reference.

BACKGROUND OF THE INVENTION

1. Field of the Invention

The present invention relates to a portable apparatus and method of measuring a wireless channel and a multiple antenna correlation that may measure a wireless channel and an antenna correlation value indoors and outdoors in real time.

2. Description of Related Art

A next generation mobile communication system requires a high speed data rate to provide a variety of high-speed multimedia services beyond an existing voice and low-speed data service. Researches on various technologies such as a broadband frequency usage, a method of using a multiple antenna, and the like have been conducted to achieve a high speed data rate. A system using multiple antennas may be more sensitive to a characteristic of a wireless channel in comparison to a single antenna system in a conventional art. Accordingly, a characteristic of a wireless channel is required to be precisely ascertained when designing a multiple antenna system. To develop a next generation mobile communication system using multiple antennas, multiple receiving/transmission antennas are to be arranged to satisfy an optimum frequency efficiency in various mobile communication environments. That is, it is critical that a distance between antennas is appropriately set to enable an antenna correlation to be minimum, and to minimize an interference and attenuation. In particular, a next generation terminal such as a Personal Digital Assistant (PDA), a cellular phone, and the like where a radio Multiple Input Multiple Output (MIMO) antenna is mounted may be developed to be portable and small. A plurality of receiving antennas may be arranged to minimize a correlation among the plurality of receiving antennas in a limited Printed Circuit Board (PCB) of the above-described terminal. For this, an apparatus that may measure a wireless channel and an antenna correlation is required.

In a conventional art, a wireless channel measurement apparatus may be mostly for outdoors, and include a plurality of baseband modules, a high-power Radio Frequency (RF) module (transmission power over 3 watt on average), and a computer including a data storage device for control and analysis. Accordingly, power consumption, size, and weight of the wireless channel measurement apparatus may be significant. Thus, a vehicle may be required when measuring an outdoor wireless channel using the wireless channel measurement apparatus, and a cart may be required for movement when measuring an indoor wireless channel. In particular, when measuring a limited indoor space, for example, a reverberation chamber measurement, an anechoic chamber measurement, an indoor-to-outdoor movement measurement, an outdoor-to-indoor movement measurement, an indoor radio wave environment measurement, and high transmission power is not required and measurement may not be easily performed using the wireless channel measurement apparatus in the conventional art.

Also, a measurement apparatus requires a storage device to store information required to analyze a channel environment and compute a correlation. Since a significant amount of information is required for the correlation computation, a mass storage device with a capacity to store a large amount of measurement data may be required. Also, a large Liquid Crystal Display (LCD) to display a measurement result as a graph, and an input device to input information required for measurement may be required. Accordingly, a small measurement apparatus may not be provided.

Also, in a conventional art, to measure a wireless channel and an antenna correlation, a wireless channel is to be first measured using a wireless channel measurement apparatus, channel measurement data is to be separately backed up on a mobile storage device, and the channel measurement data is to be analyzed using a computer, which is a complex process. Accordingly, a measurement apparatus to measure an antenna correlation of terminal antenna pattern PCBs in a variety of indoor and outdoor environments including a reverberation chamber is required to develop a radio MIMO terminal.

BRIEF SUMMARY OF THE INVENTION

An exemplary embodiment of the present invention provides a portable apparatus and method of measuring a wireless channel and a multiple antenna correlation which may externally connect an input device, a large Liquid Crystal Display (LCD) monitor, and a mass storage device, may back up information, stored in an embedded small storage device, on the mass storage device, and thereby may enable the apparatus to be portable and small.

An exemplary embodiment of the present invention also provides a portable apparatus and method of measuring a wireless channel and a multiple antenna correlation which may search a maximum peak value of a channel impulse response of a single channel in wireless channel data, retrieve a delay value, gather channel coefficients for each receiving antenna in a same location based on the delay value to calculate the correlation, and thereby may simplify the correlation calculation process, and reduce power consumption, and improve a processing performance.

According to an exemplary embodiment of the present invention, there is provided a portable apparatus of measuring a wireless channel and a multiple antenna correlation, the apparatus including: a Radio Frequency (RF) unit to control a frequency of a signal to be measured, to broadcast the signal to be measured through multiple transmission antennas, to control a frequency of a received signal, and to send the received signal to the baseband unit, the received signal being received through multiple receiving antennas; and a baseband unit to generate and transmit, to the RF unit, the signal to be measured, to measure wireless channels for each of the multiple transmission antennas and wireless channels for each of the multiple receiving antennas based on the received signal output from the RF unit, to calculate a correlation for each of the multiple transmission antennas based on the wireless channels for each of the multiple transmission antennas, and to calculate a correlation for each of the multiple receiving antennas based on the wireless channels for each of the multiple receiving antennas.

The baseband unit may search a maximum peak value from a channel impulse response of any one of the wireless channels for each of the multiple receiving antennas, retrieve a delay value corresponding to the maximum peak value, gather channel coefficients having an identical delay value in each of the wireless channels, and calculate a receiving antenna correlation value based on the channel coefficients.

The baseband unit may search a maximum peak value from a channel impulse response of any one of the wireless channels for each of the multiple transmission antennas, retrieve a delay value corresponding to the maximum peak value, gather channel coefficients having an identical delay value in each of the wireless channels, and calculate a transmission antenna correlation value based on the channel coefficients.

According to an exemplary embodiment of the present invention, there is provided a multiple antenna correlation measurement method, including: setting an antenna parameter, a bandwidth, and a measurement frequency of each of a transmitter and a receiver; generating a measurement signal for channel measurement; sequentially broadcasting the measurement signal through transmission antennas; receiving and storing a received signal from receiving antennas, the received signal being the measurement signal changed based on a surrounding environment; measuring wireless channels for each of the transmission antennas and wireless channels for each of the receiving antennas based on the received signal; calculating a correlation for each multiple transmission antenna based on the wireless channels for each of the transmission antennas; and calculating a correlation for each multiple receiving antenna based on the wireless channels for each of the receiving antennas.

According to an exemplary embodiment of the present invention, a portable apparatus and method of measuring a wireless channel and a multiple antenna correlation may externally connect an input device, a large LCD monitor, and a mass storage device, may back up information, stored in an embedded small storage device, on the mass storage device, and thereby may enable the apparatus to be portable and small.

Also, according to an exemplary embodiment of the present invention, a portable apparatus and method of measuring a wireless channel and a multiple antenna correlation may search a maximum peak value of a channel impulse response of a single channel in wireless channel data, retrieve a delay value, calculate a single channel coefficient for each receiving antenna in a same location based on the delay value to calculate the correlation, and thereby may simplify the correlation calculation process, reduce power consumption, and increase processing performance.

BRIEF DESCRIPTION OF THE DRAWINGS

The above and/or other aspects, features and advantages of the present invention will now become apparent and more readily appreciated from the following description of exemplary embodiments, taken in conjunction with the accompanying drawings, in which:

FIG. 5 is a diagram illustrating an example of a wireless channel measured in a receiving antenna in a multiple antenna correlation measurement system according to an exemplary embodiment of the present invention.

DETAILED DESCRIPTION OF EMBODIMENTS

Figure 1:
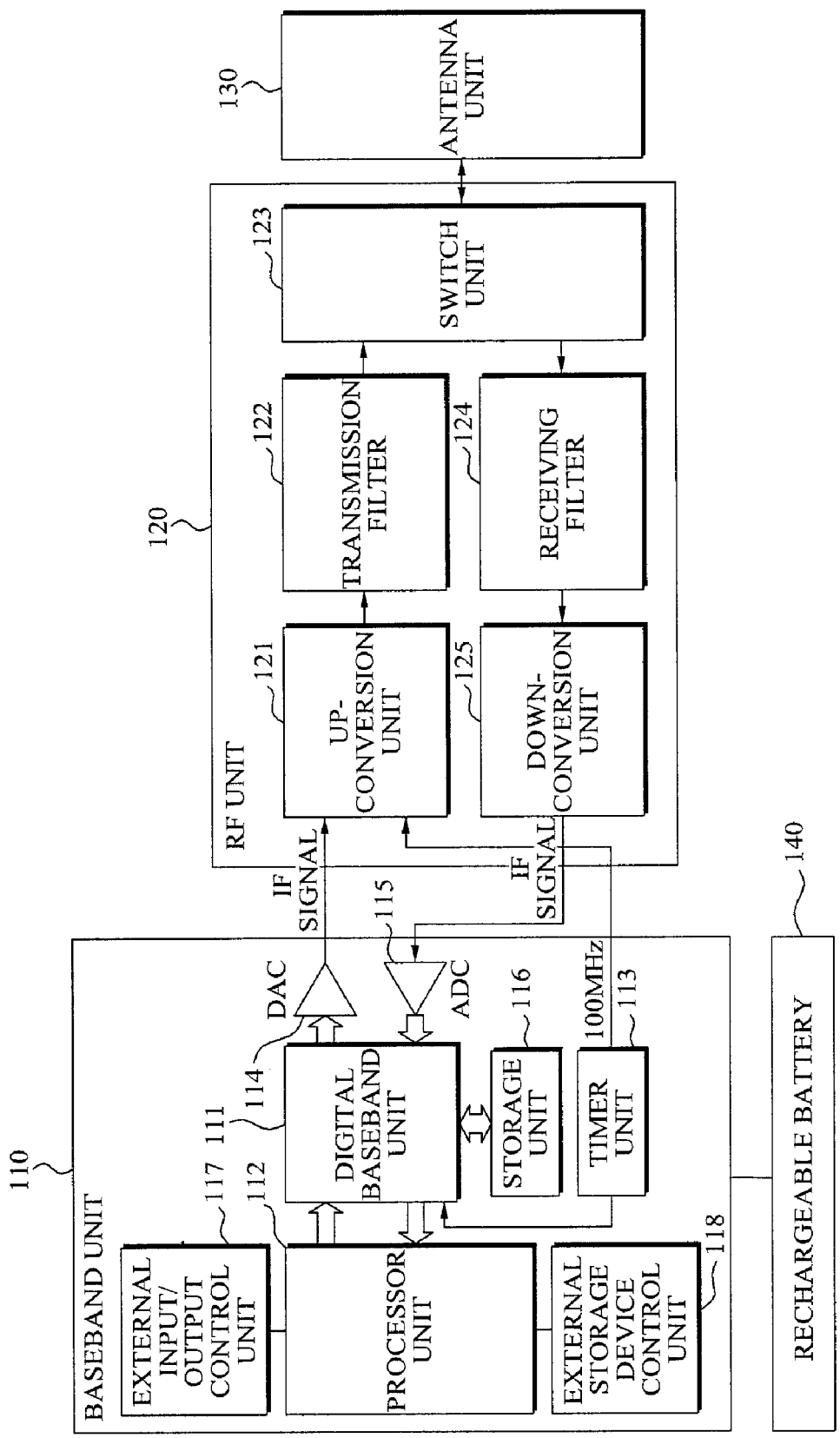
FIG. 1 is a diagram illustrating a configuration of a portable apparatus of measuring a wireless channel and a multiple antenna correlation according to an exemplary embodiment of the present invention.

FIG. 1 is a diagram illustrating a configuration of a portable apparatus of measuring a wireless channel and a multiple antenna correlation according to an exemplary embodiment of the present invention.

Referring to FIG. 1, a baseband unit 110 may generate and transmit a signal to be measured, to a Radio Frequency (RF) unit 120. The RF unit 120 may up-convert a frequency of the signal to be measured, and transmit the signal to be measured through multiple transmission antennas. Also, the RF unit 120 may down-convert a frequency of a received radio frequency signal, and sends the received signal to the baseband unit 110. The received radio frequency signal may be received through multiple receiving antennas. In this instance, the baseband unit 110 may measure wireless channels for each of the multiple transmission antennas and wireless channels for each of the multiple receiving antennas, based on the received signal output from the RF unit. Also, the baseband unit 110 may calculate a correlation for each of the multiple transmission antennas based on the wireless channels for each of the multiple transmission antennas, and calculate a correlation for each of the multiple receiving antennas based on the wireless channels for each of the multiple receiving antennas.

Hereinafter, the portable apparatus of measuring a wireless channel and a multiple antenna correlation may be referred to as a 'measurement apparatus'. The measurement apparatus may include a small Liquid Crystal Display (LCD) that may display a text, and thus an operation state of the measurement apparatus, the measured correlation value, and a wireless channel measurement result may be displayed as a text.

As illustrated in FIG. 1, the baseband unit 110 may include a processor unit 112, a digital baseband unit 111, a timer unit 113, a Digital-to-Analog Converter (DAC) 114, an Analog-to-Digital Converter (ADC) 115, a storage unit 116, an external input/output control unit 117, and an external storage device control unit 118 to generate and transmit a probing signal for wireless channel measurement, to store and analyze a received signal received from the multiple receiving antennas.

The processor unit 112 may control operations of all hardware of the measurement apparatus according to a user's command. Specifically, the processor unit 112 may perform any one of a transmission process and a receiving process according to the user's command. The transmission process may control an operation when the measurement apparatus is operated as a transmitter, and the receiving process may control an operation when the measurement apparatus is operated as a receiver. Also, the processor unit 112 may calculate a correlation for each of multiple antennas based on information stored in the storage unit 116.

The digital baseband unit 112 may generate probing digital data, that is, Pseudo random Noise (PN) sequence, for wireless channel measurement under control of the processor unit 112. Also, the digital baseband unit 112 may transmit the probing digital data to the DAC 114 according to a clock or a timing signal provided from the timer unit 113. Also, the digital baseband unit 112 may collect information from a digital-type received signal received from the ADC 115.

The DAC 114 may convert the digital-type probing digital data into an analog-type signal to be measured, and transmit the analog-type signal to be measured to the RF unit 120.

The ADC 115 may perform sampling with respect to the analog-type received signal output from the RF unit 120 using a sampling clock. The sampling clock may be provided from the timer unit 113. The ADC 115 may convert the analog-type received signal into the digital-type received signal, and transmit the digital-type received signal to the digital baseband unit 111.

The storage unit 116 may be information storage device having a size and weight equal to or less than a predetermined size and weight.

In this instance, the size and weight may be of a size and weight that do not affect portability.

The external input/output control unit 117 may be connected to an external device, and control information transmission between the external device and the measurement apparatus.

The external device may include an input device and an output device. The input device may be used to input settings in the processor unit 112, and the output device may be used to receive and display information calculated in the processor unit 112.

The input device may include at least one of a touch pad and a keyboard.

The output device may include at least one of an LCD, a notebook computer, and a Personal Computer (PC), having a sufficient size to display a graph. In this instance, the output device may receive a measurement result, that is, the correlation value, calculated in the processor unit 112, from the external input/output control unit 117, and display the correlation value as a graphically or as text.

The external storage device control unit 118 may be connected to an external storage device to support the storage unit 116 with a limited information storage capacity due to a limit of the size and weight. The external storage device may store or back up mass information. Also, the external storage device control unit 118 may control a connection and information transmission between the external storage device and the measurement apparatus.

Also, a Universal Serial Bus (USB) device connected to a USB port may be used as the external storage device control unit 118, and the external storage device connected to the external storage device control unit 118 may be a hard disk or an external memory having compatibility with a USB interface.

In this instance, the RF unit 120 may include an up-conversion unit 121, a transmission filter 122, a switch unit 123, a receiving filter 124, and a down-conversion unit 125. The up-conversion unit 121 may up-convert a frequency of the signal to be measured, and generate an upstream radio frequency measurement signal. The transmission filter 122 may filter the upstream radio frequency measurement signal and generate a radio frequency measurement signal to be transmitted. The switch unit 123 may enable the radio frequency measurement signal to be transmitted from the multiple transmission antennas, and transmit the received radio frequency signal, received from each of the multiple receiving antennas, to the receiving filter 124. The receiving filter 124 may filter a frequency of the received radio frequency signal The down-conversion unit 125 may down-convert a frequency of the received radio frequency signal, filtered through the receiving filter 124, and may transmit the down-converted signal to the baseband unit 110.

A configuration of the RF unit 120 is described in detail below with reference to FIG. 2.

The antenna unit 130 may be a plurality of antennas that may transmit a radio frequency signal transmitted from the switch unit 123 or transmit a radio frequency signal, received from outside, to the switch unit 123. The antenna unit 130 may be used as a multiple transmission antenna or a multiple receiving antenna.

A rechargeable battery 140 may provide power to the measurement apparatus, and be formed to be removable. When connected to an external power providing device, the rechargeable battery 140 may provide power to the measurement apparatus during recharge.

Figure 2:
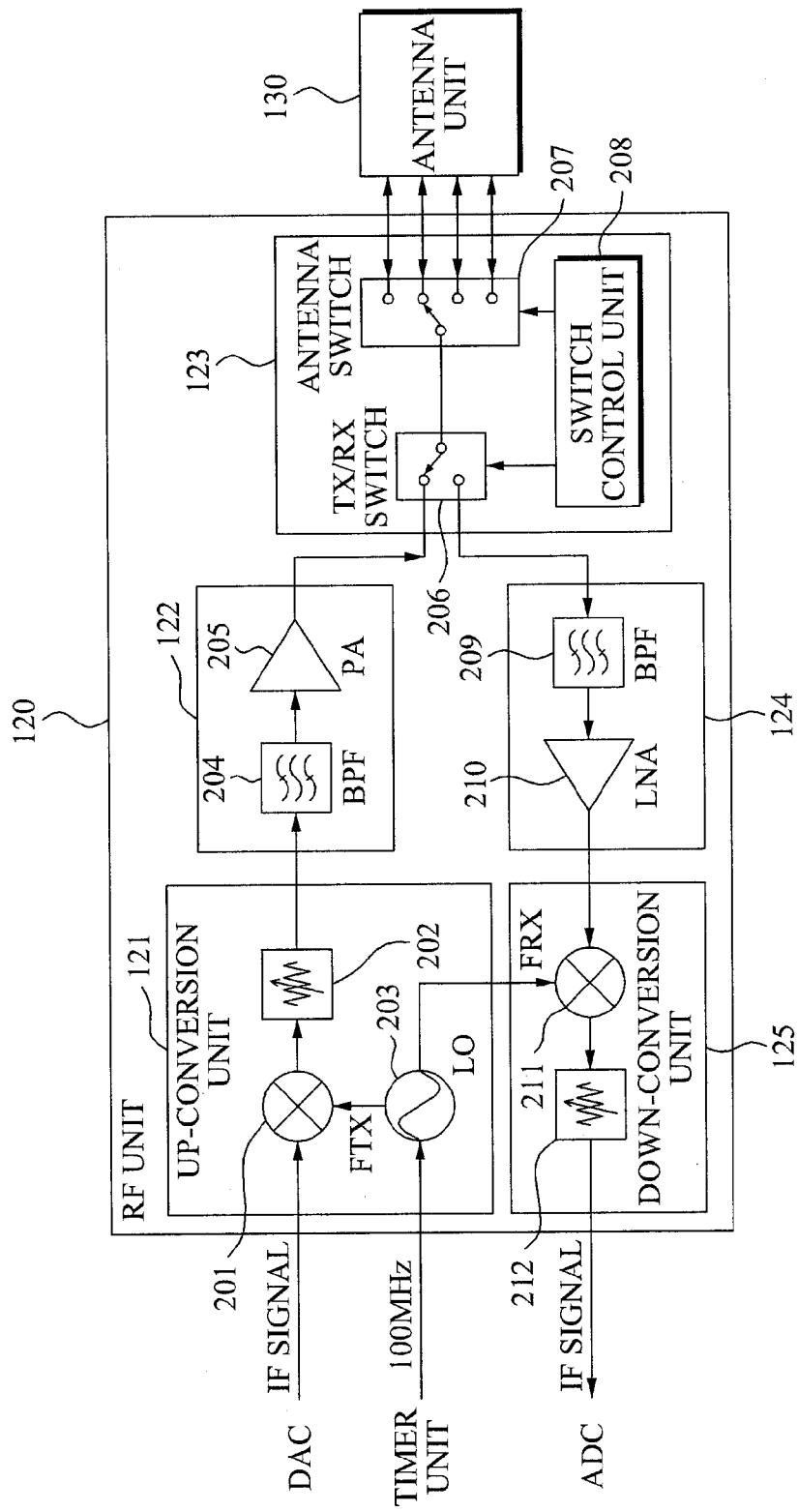
FIG. 2 is a diagram illustrating an example of a configuration of a Radio Frequency (RF) unit according to an exemplary embodiment of the present invention.

FIG. 2 is a diagram illustrating an example of a configuration of the RF unit 120 according to an exemplary embodiment of the present invention.

As illustrated in FIG. 2, the up-conversion unit 121 of the RF unit 120 may include a local oscillator 203, a transmission multiplexer 201, and a transmission variable attenuator 202.

The local oscillator 203 may self-oscillate based on a standard clock of 10 MHz, and generate a reference clock to generate a transmission frequency clock, for example, 2.580 GHz. The standard clock may be provided from the timer unit 113.

The transmission multiplexer 201 may up-convert a frequency of the analog-type signal to be measured, transmitted from the DAC 114, based on the reference clock generated in the local oscillator 203, and thereby may generate the upstream radio frequency measurement signal.

The transmission variable attenuator 202 may control the power of the upstream radio frequency measurement signal under control of the processor unit 112, and adjust a output power level of the upstream radio frequency measurement signal.

As illustrated in FIG. 2, the transmission filter 122 of the RF unit 120 may include a band-pass filter (BPF) 204 and a high power amplifier (PA) 205. The BPF 204 may limit a band of the upstream radio frequency measurement signal, and the PA 205 may amplify a power of the band-limited upstream radio frequency measurement signal, and generate the radio frequency measurement signal to be transmitted.

As illustrated in FIG. 2, the switch unit 123 of the RF unit 120 may include a transmission/receiving switch 206, an antenna switch 207, and a switch control unit 208. The transmission/receiving switch 206 may select whether to connect the transmission filter 122 to receive the radio frequency measurement signal to be transmitted, or whether to connect the receiving filter 124 to transmit the received radio frequency signal to be measured. The antenna switch 207 may select an antenna to be operated from a plurality of antennas included in the antenna unit 130. The switch control unit 208 may control the selection of the transmission/receiving switch 206 and the antenna switch 207.

When the measurement apparatus is used as a transmitter, the transmission/receiving switch 206 may be set by the switch control unit 208 as a transmission path, and thereby may connect the PA 205 with the antenna switch 207. When the measurement apparatus is used as a receiver, the transmission/receiving switch 206 may be set by the switch control unit 208 as a receiving path, and thereby may connect the BPF 209 with the antenna switch 207. A signal of the switch control unit 208 may be a control signal generated by the timer unit 113. Also, the signal of the switch control unit 208 may include switching control signals generated based on transmission/receiving timing.

The antenna switch 207 may have a configuration of 1:4 switching port, when four antenna ports are included in the antenna unit 130. The antenna switch 207 may sequentially output a radio frequency signal, transmitted from the PA 205, to a corresponding antenna port in the antenna unit 130 according to the signal of the switch control unit 208, and thereby may enable a radio wave to be sequentially transmitted from the antenna unit 130. Also, the antenna switch 207 may sequentially select and transmit each of four received frequencies, received in the four antenna ports, to the receiving filter 124 under control of the switch control unit 208.

As illustrated in FIG. 2, the receiving filter 124 of the RF unit 120 may include a BPF 209 and a Low Noise Amplifier (LNA) 210. When the received radio frequency signal to be measured, received from each of the plurality of antennas according to the antenna switch 207, is sequentially received through the switch control unit 208, the BPF 209 may limit a band of the received radio frequency signal to be measured. The LNA 210 may amplify the band-limited received radio frequency signal and remove a noise, and thereby may generate a received radio frequency signal.

As illustrated in FIG. 2, the down-conversion unit 125 of the RF unit 120 may include a receiving multiplexer 211 and a receiving variable attenuator 212.

The receiving multiplexer 211 may down-convert a frequency of the received radio frequency signal, transmitted from the LNA 210, based on the reference clock generated in the local oscillator 203.

The variable attenuator 212 may control the power of a received signal whose frequency is down-converted in the receiving multiplexer 211 under control of the processor unit 112, and adjust an input power level of the analog-type received signal. Also, the variable attenuator 212 may send the analog-type received signal to the ADC 115, and thereby may control an input power level of the received signal.

Figure 3:
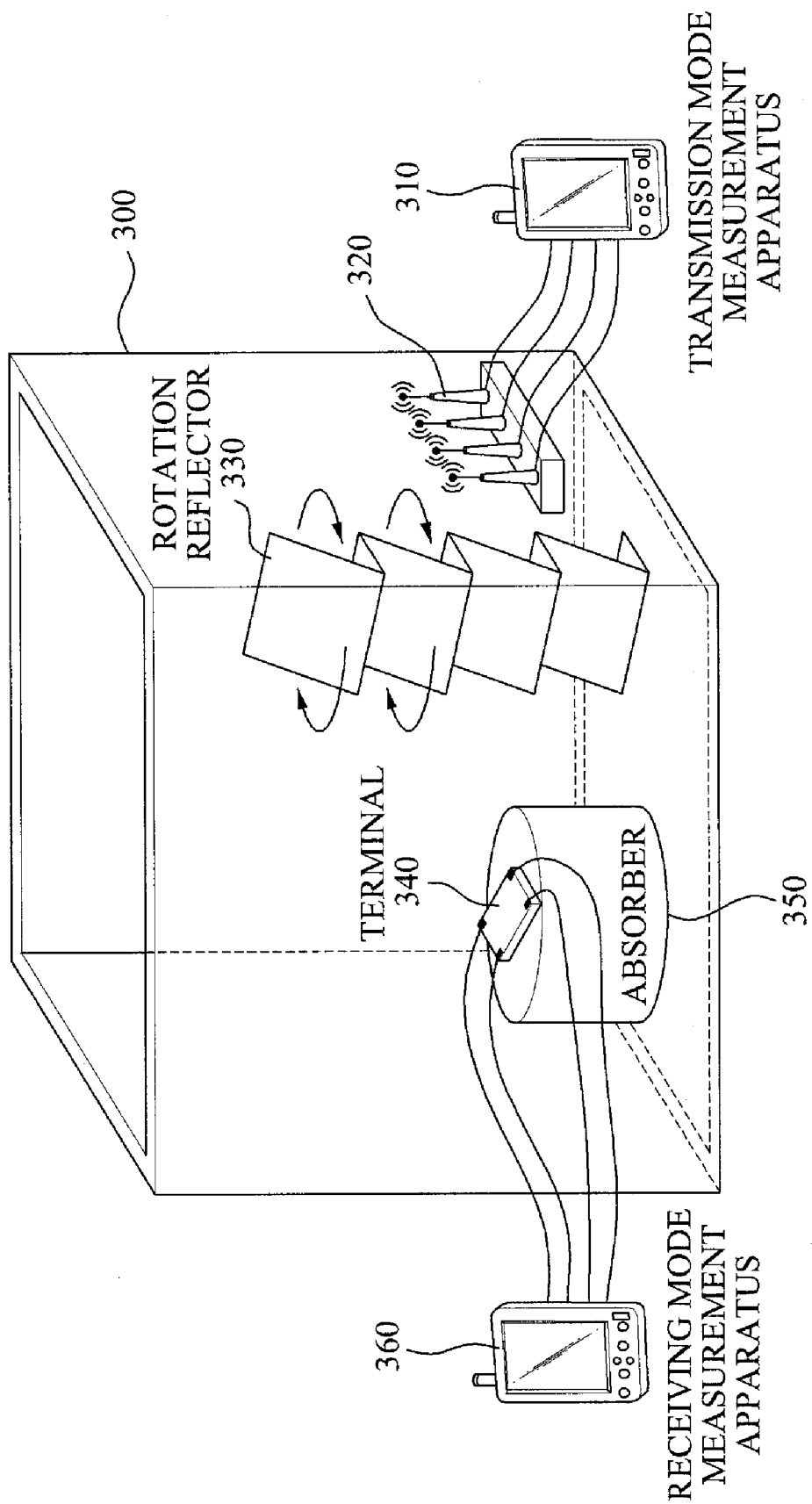
FIG. 3 is a diagram illustrating an example of a multiple antenna correlation measurement system according to an exemplary embodiment of the present invention.

FIG. 3 is a diagram illustrating an example of a multiple antenna correlation measurement system according to an exemplary embodiment of the present invention.

The multiple antenna correlation measurement system may be used to measure a wireless channel in a reverberation chamber, analyze a channel environment, and measure a correlation among antenna elements, embedded in an antenna pattern on Printed Circuit Boards (PCBs) of a terminal 340, for development of various next generation wireless MIMO terminals. The multiple antenna correlation measurement system may include a reverberation chamber 300, a measurement apparatus in a transmission mode, hereinafter, referred to as 'transmission mode measurement apparatus' 310, a measurement apparatus in a receiving mode, hereinafter, referred to as 'receiving mode measurement apparatus' 360, a plurality of transmission antennas 320, a rotation reflector 330, a terminal 340, and an absorber 350. The transmission mode measurement apparatus 310 may generate a signal to be measured. The plurality of transmission antennas 320 may be connected to the transmission mode measurement apparatus 310, and may transmit a radio wave generated based on the signal to be measured, to an inside of the reverberation chamber 300. The rotation reflector 330 may rotate at a regular speed, and reflect the radio wave in various directions. The terminal 340 may be manufactured in various type of samples, and receive various types of received radio waves being generated by the rotation reflector 330. The absorber 350 may absorb radio waves, which are not received in the terminal 340, to prevent the radio waves from being reflected. The receiving mode measurement apparatus 360 may measure and analyze the wireless channel environment of the reverberation chamber 300 based on the received radio wave.

The reverberation chamber 300 may be used to generate and examine various wireless channel environments such as a reflected wave, a fading, a Doppler effect, and the like using the rotation reflector 330. A rotation speed of the rotation reflector 330 may be controlled by a user depending on a radio wave environment, and the rotation reflector 330 may simulate a variety of radio wave environments that may be generated indoors or outdoors.

Also, the transmission mode measurement apparatus 310 and the receiving mode measurement apparatus 360 may be a measurement apparatus according to the present invention, and may use a transmission mode and a receiving mode depending on a setting. In the transmission mode, a signal to be measured may be generated and transmitted. In the receiving mode, a received signal may be analyzed and a correlation with a channel environment may be measured.

Referring to FIG. 3, the transmission mode measurement apparatus 310 may broadcast the generated radio signal to be measured through the plurality of transmission antennas 320. The transmitted radio waves to be measured may be reflected in various directions by the rotation reflector 330 rotating at a predetermined rotation speed in the reverberation chamber 300. In this instance, the reflected radio waves may be multipath rays having a variety of amplitudes, delays, and phases. Also, each of the reflected radio waves may be generated in various forms depending on the rotation speed of the rotation reflector 330.

The received radio waves in the form of multipath rays may be received through antenna elements embedded in the terminal 340, and be inputted in the receiving mode measurement apparatus 360. In this instance, the receiving mode measurement apparatus 360 may measure and analyze the wireless channel environment in the reverberation chamber 300.

The multiple antenna correlation measurement system may measure the correlation of the antenna elements of the terminal 340, and a correlation based on an interval of the plurality of transmission antennas 320. A result of the measurement may be ascertained through the receiving mode measurement apparatus 360 in real time. Also, the wireless channel analysis result and the multiple antenna correlation measurement result may be displayed graphically by connecting the receiving mode measurement apparatus 360 to a notebook computer.

Also, the reverberation chamber 300 may be an example where the multiple antenna correlation measurement system may be applied. When another measurement such as an anechoic chamber measurement, indoor-to-outdoor movement measurement, outdoor-to-indoor movement measurement, an indoor radio wave environment measurement is performed, the transmission mode measurement apparatus 310, the plurality of transmission antennas 320, the terminal 340, and the receiving mode measurement apparatus 360 may be installed for measurement.

Figure 4:
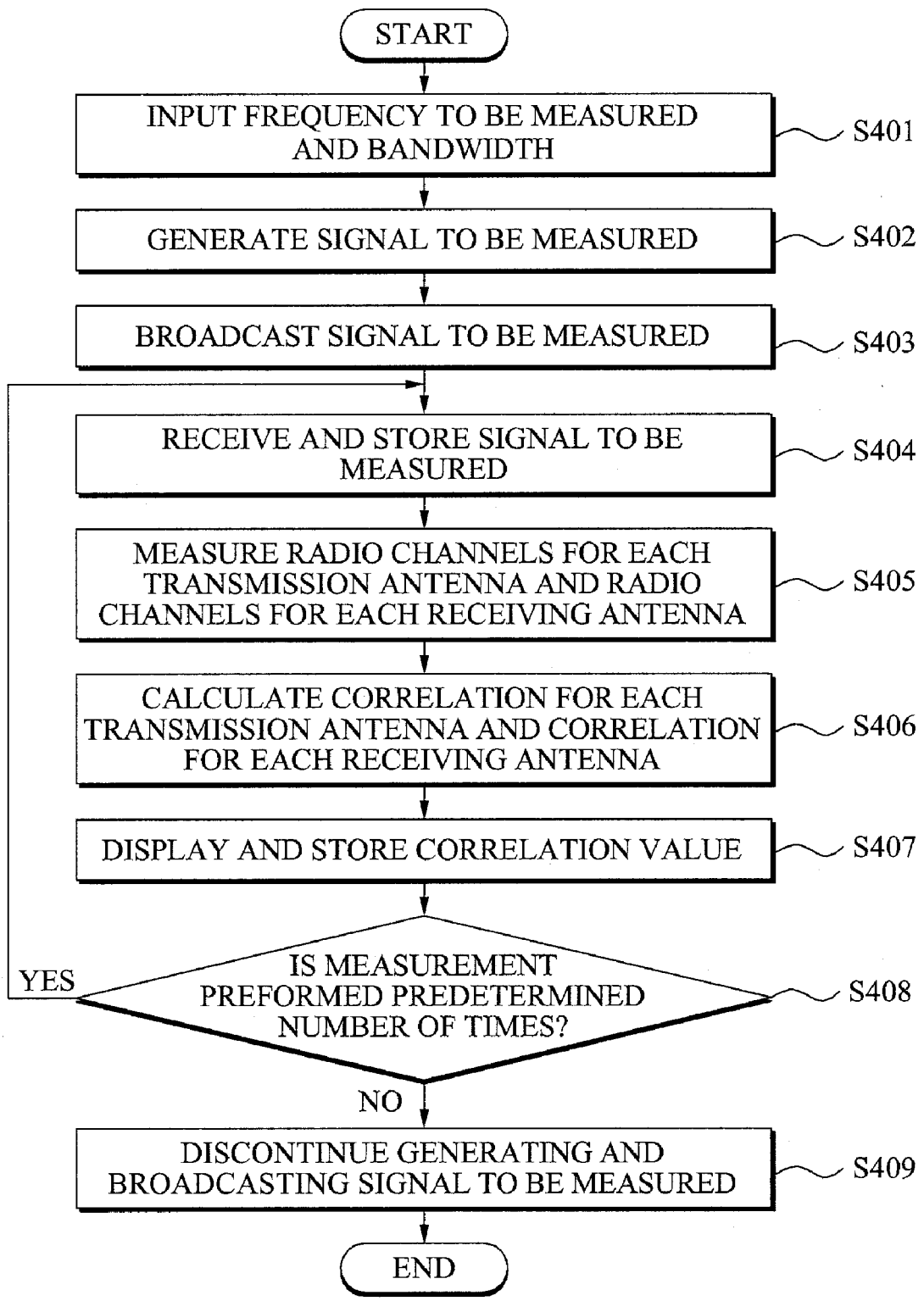
FIG. 4 is a flowchart illustrating a method of measuring a multiple antenna correlation according to an exemplary embodiment of the present invention.

FIG. 4 is a flowchart illustrating a method of measuring a multiple antenna correlation according to an exemplary embodiment of the present invention.

In operation S401, a frequency to be measured and a bandwidth may be inputted to a transmission mode measurement apparatus 310 and a receiving mode measurement apparatus 360.

In this instance, a number of transmission antennas, a number of receiving antennas, a radio wave transmission power level through the transmission antennas, an receiving power level through receiving antennas, and the like may be set.

In operation S402, the transmission mode measurement apparatus 310 may generate a signal to be measured. Specifically, the transmission mode measurement apparatus 310 may further get the information about a number of iterations, a cycle of a probing signal for channel measurement, and the like, as well as the information inputted in operation S401, and thereby may generate the signal to be measured.

In operation S403, the transmission mode measurement apparatus 310 may sequentially broadcast the generated signal to be measured through a plurality of transmission antennas 320. In this instance, the plurality of transmission antennas 320 may be a multiple transmission antenna.

In operation S404, the receiving mode measurement apparatus 360 may sequentially receive the broadcasted signal to be measured through receiving antennas embedded in a terminal 340. Also, the receiving mode measurement apparatus 360 may collect information from a received radio frequency signal, and store the information in an external storage device connected to an external storage device control unit 118 or a storage unit 116.

In this instance, the signal received in each of the receiving antennas may be a signal changed depending on a wireless channel environment between each of the plurality of transmission antennas 320 and each of the receiving antennas.

In operation S405, the receiving mode measurement apparatus 360 may measure wireless channels for each of the transmission antennas and wireless channels for each of the receiving antennas based on the information collected in operation S404.

In operation S406, the receiving mode measurement apparatus 360 may calculate a correlation for each of the transmission antennas and a correlation for each of the receiving antennas using information about the wireless channels measured in operation S405, which is described in detail with reference to FIG. 5.

In operation S407, the receiving mode measurement apparatus 360 may display the correlation calculated in operation S406 in real time, and store the correlation in the external storage device connected to the external storage device control unit 118 or the storage unit 116.

In operations S404 through S407, the receiving mode measurement apparatus 360 may store only information required for correlation calculation in the storage unit 116 based on a storage capacity of the storage unit 116, and store other information excluding the information for the correlation calculation in the external storage device connected to the external storage device control unit 118.

In operation S408, the transmission mode measurement apparatus 310 may ascertain whether the wireless channels and correlations have been measured a predetermined number of times, and continue transmitting a radio wave for measurement, when the measurement has not been performed the predetermined number of times.

In operation S409, the transmission mode measurement apparatus 310 may discontinue generating and broadcasting the signal to be measured, and the receiving mode measurement apparatus 360 may also discontinue receiving the signal to be measured and discontinue calculating the correlation.

FIG. 5 is a diagram illustrating an example of a wireless channel measured in a receiving antenna in a multiple antenna correlation measurement system according to an exemplary embodiment of the present invention.

Referring to FIG. 5, a radio wave, sequentially transmitted through four transmission antennas, that is, a Tx(1) 510, a Tx(2) 520, a Tx(3) 530, and a Tx(4) 540, may be received in four receiving antennas, that is, an Rx(1) 550, an Rx(2) 560, an Rx(3) 570, and an Rx(4) 580. The Tx(1) 510, the Tx(2) 520, the Tx(3) 530, and the Tx(4) 540 may be included in a transmission antenna 320 connected to a transmission mode measurement apparatus 310. Also, the Rx(1) 550, the Rx(2) 560, the Rx(3) 570, and the Rx(4) 580 may be included in a terminal 340 connected to a receiving mode measurement apparatus 360. In this instance, received radio waves including various wireless channel information waves may be a direct path ray and multipath rays, and form a wireless channel matrix [H] represented as, $$[H] = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \qquad \text{[Equation 1]}$$

where i and j of $h_{ij}$ may denote an index of a transmission antenna, and an index of a receiving antenna, respectively.

A method of calculating a correlation between Rx(1) 550 and Rx(2) 560 based on Tx(1) 510 is described below, as an example of calculating a correlation using the measured wireless channel [H] as shown above. Here, it may be assumed that a channel measurement is continuously performed 100 times.

100 channels $h_{11}$ and 100 channels $h_{12}$ may be obtained in the wireless channel [H].

A maximum peak value may be searched from a channel impulse response of a first channel $h_{11}$, and a sequence number corresponding to the maximum peak value, that is, a delay value D, may be retrieved.

In this instance, the receiving mode measurement apparatus 360 may retrieve channel coefficients, $a_{11}$ and $a_{12}$, having an identical delay value D in the channel $h_{11}$ and the channel $h_{12}$. The channel coefficients, $a_{11}$ and $a_{12}$, may be a complex number.

The above-described operations may be repeated, and thus 100 channel coefficients, $a_{11i}$ and $a_{12i}$, may be retrieved from each of the 100 channels $h_{11i}$ and the 100 channels $h_{12i}$. Here, i may denote an index of 1 through 100, and $a_{11i}$ may denote an $i^{th}$ channel coefficient, and $h_{11i}$ may denote an $i^{th}$ channel of $h_{11}$, and $h_{12i}$ may denote an $i^{th}$ channel of $h_{12}$.

The correlation between Rx(1) 550 and Rx(2) 560 may be obtained by applying the channel coefficient to Equation 2 given as below.

$$Coeff_{RX1,RX2} = \frac{\text{Cov}(a_{11}, a_{12})}{\sqrt{\text{Cov}(a_{11}, a_{11})}\sqrt{\text{Cov}(a_{12}, a_{12})}} \qquad \text{[Equation 2]}$$

When $a_{11i}=A_i+jB_i$ and $a_{12i}=C_i+jD_i$ are satisfied and i may be 1 through 100, $a_{11}$ and $a_{12}$ may satisfy Equation 3 given as below.

$$\text{Cov}(a_{11}, a_{11}) = \frac{1}{100}\sum_{i=1}^{100}(A_i - \overline{A})^2 + \frac{1}{100}\sum_{i=1}^{100}(B_i - \overline{B})^2 \qquad \text{[Equation 3]}$$

$$\text{Cov}(a_{12}, a_{12}) = \frac{1}{100}\sum_{i=1}^{100}(C_i - \overline{C})^2 + \frac{1}{100}\sum_{i=1}^{100}(D_i - \overline{D})^2$$

$$\text{Cov}(a_{11}, a_{112}) = \frac{1}{100}\left\{\sum_{i=1}^{100}(a_{11i} - \overline{a_{11}})(a_{12i} - \overline{a_{12}})\right\}$$

A method of calculating a correlation between Tx(1) 510 and Tx(2) 520 based on Rx(1) 550 is described below, as an example of calculating a correlation using the measured wireless channel [H].

100 channels $h_{11}$ and 100 channels $h_{21}$ may be obtained in the wireless channel [H].

A maximum peak value may be searched from a channel impulse response of a first channel $h_{11}$, and a sequence number corresponding to the maximum peak value, that is, a delay value D, may be retrieved.

In this instance, the receiving mode measurement apparatus 360 may retrieve channel coefficients, $a_{11}$ and $a_{21}$, having an identical delay value D in the channel $h_{11}$ and the channel $h_{21}$. The channel coefficients, $a_{11}$ and $a_{21}$, may be a complex number.

The above-described operations may be repeated, and thus 100 channel coefficients, $a_{11i}$ and $a_{21i}$, may be retrieved Here, i may denote an index of 1 through 100, and $a_{11i}$ may denote an $i^{th}$ channel coefficient.

The correlation between Tx(1) 510 and Tx(2) 520 may be obtained by applying the channel coefficient to Equation 4 given as below.

$$Coeff_{TX1,TX2} = \frac{Cov(a_{11}, a_{21})}{\sqrt{Cov(a_{11}, a_{11})}\sqrt{Cov(a_{12}, a_{21})}} \quad \text{[Equation 4]}$$

According to the present invention, the measurement apparatus may externally connect to an input device, an LCD, and a mass storage device which may affect a size of the measurement apparatus, back up information, stored in an embedded small storage device, on the mass storage device, and thereby may reduce a size of the measurement apparatus.

Also, according to the present invention, the measurement apparatus may be used as a transmitter and a receiver, and thereby may improve an efficiency of the measurement apparatus and reduce a manufacturing cost.

In a conventional art, an antenna correlation may be calculated using all of channel coefficients of channel data received from multiple antennas. However, according to the present invention, the measurement apparatus may search a maximum peak value of a channel impulse response of a single channel from wireless channel data, retrieve a delay value, gather channel coefficients for each receiving antenna in a same location based on the delay value, calculate a correlation, and thereby may confirm a correlation value of antenna elements, embedded in various types of wireless Multiple Input and Multiple Output (MIMO) terminal antenna pattern PCBs, in real time and may support a development of various MIMO terminals, as well as simplify a calculation process, reduce power consumption, and increase processing performance.

Although a few exemplary embodiments of the present invention have been shown and described, the present invention is not limited to the described exemplary embodiments. Instead, it would be appreciated by those of ordinary skill in the art that changes may be made to these exemplary embodiments without departing from the principles and spirit of the present invention, the scope of which is defined by the claims and their equivalents.

What is claimed is:

1. A portable apparatus of measuring a wireless channel and a multiple antenna correlation, the apparatus comprising:
    a Radio Frequency (RF) unit to control a frequency of a signal to be measured, to broadcast the signal to be measured through multiple transmission antennas, to control a frequency of a received signal, and to send the received signal to a baseband unit, the received signal being received through multiple receiving antennas; and
    the baseband unit to generate and transmit, to the RF unit, the signal to be measured, to measure wireless channels for each of the multiple transmission antennas and wireless channels for each of the multiple receiving antennas based on the received signal output from the RF unit, to calculate a correlation for each of the multiple transmission antennas based on the wireless channels for each of the multiple transmission antennas, and to calculate a correlation for each of the multiple receiving antennas based on the wireless channels for each of the multiple receiving antennas,
    wherein the baseband unit searches a maximum peak value from a channel impulse response of any one of the wireless channels for each of the multiple receiving antennas, retrieves a delay value corresponding to the maximum peak value, gathers channel coefficients having an identical delay value in each of the wireless channels, and calculates a receiving antenna correlation value based on the channel coefficients.

2. The apparatus of claim 1, wherein the baseband unit searches a maximum peak value from a channel impulse response of any one of the wireless channels for each of the multiple transmission antennas, retrieves a delay value corresponding to the maximum peak value, gathers channel coefficients having an identical delay value in each of the wireless channels, and calculates a transmission antenna correlation value based on the channel coefficients.

3. The apparatus of claim 2, wherein each of the channel coefficients having the identical delay value is a complex number.

4. The apparatus of claim 1, wherein each of the channel coefficients having the identical delay value is a complex number.

5. The apparatus of claim 1, wherein the baseband unit comprises:
    a timer unit to provide a clock and a timing signal;
    a digital baseband unit to generate probing digital data for measurement, to transmit the probing digital data to a Digital-to-Analog Converter (DAC) according to the clock and the timing signal, and to collect information from a digital-type received signal, the digital-type received signal being received from an Analog-to-Digital Converter (ADC);
    a storage unit to store the information collected by the digital baseband unit;
    the DAC to convert the digital-type probing digital data into an analog-type signal to be measured, and transmit the analog-type signal to be measured to the RF unit;
    the ADC to perform sampling with respect to the analog-type received signal output from the RF unit using a sampling clock, to convert the analog-type received signal into the digital-type received signal, and to transmit the digital-type received signal to the digital baseband unit, the sampling clock being provided from the timer unit; and
    a processor unit to calculate a correlation for each multi-antenna based on the information stored in the storage unit.

6. The apparatus of claim 5, wherein the baseband unit further comprises:
    an external input/output control unit to be connected to an input device and an output device, the input device being used to input settings in the processor unit, and the output device being used to receive and display information calculated in the processor unit; and an external storage device control unit to be connected to an external storage device storing or backing up mass information.

7. The apparatus of claim 6, wherein the output device includes at least one external terminal of a Liquid Crystal Display (LCD), a notebook computer, and a Personal Computer (PC) having a sufficient size to displays a graph.

8. The apparatus of claim 6, wherein the output device receives a measurement result, the correlation calculated by the processor unit, from the external input/output control unit, and displays the measurement result graphically.

9. The apparatus of claim 6, wherein the processor unit backs up the information, stored in the storage unit, on the external storage device through the external storage device control unit.

10. The apparatus of claim 6, wherein the RF unit comprises:
   an up-conversion unit to up-convert a frequency of the signal to be measured, and to generate an upstream radio frequency measurement signal;
   a transmission filter to filter the upstream radio frequency measurement signal and generate a radio frequency measurement signal to be transmitted;
   a receiving filter to filter a frequency of the received radio frequency signal;
   a down-conversion unit to down-convert a frequency of the received radio frequency signal, filtered through the receiving filter, and send the down-converted signal to the baseband unit; and
   a switch unit to enable the radio frequency measurement signal to be transmitted from each of the multiple transmission antennas, and to send the received radio frequency signal, received from each of the multiple receiving antennas, to the receiving filter.

11. The apparatus of claim 10, wherein the up-conversion unit comprises:
   a local oscillator to self-oscillate based on a standard clock, and generate a reference clock to generate a transmission frequency clock, the standard clock being provided by the timer unit;
   a transmission multiplexer to up-convert a frequency of the analog-type signal to be measured, transmitted from the DAC, based on the reference clock generated in the local oscillator, and to generate the upstream radio frequency measurement signal; and
   a transmission variable attenuator to control the power of the upstream radio frequency measurement signal, and adjust an output power level of the upstream radio frequency measurement signal.

12. The apparatus of claim 11, wherein the down-conversion unit comprises:
   a receiving multiplexer to down-convert a frequency of the received radio frequency signal, filtered through the receiving filter, based on the reference clock generated in the local oscillator; and
   a receiving variable attenuator to control the power of the received signal whose frequency is down-converted in the receiving multiplexer, and adjust a input power level of the analog-type received signal.

13. A multiple antenna correlation measurement method, comprising:
   setting an antenna parameter, a bandwidth, and a measurement frequency of each of a transmitter and a receiver;
   generating a measurement signal for channel measurement;
   sequentially broadcasting the measurement signal through transmission antennas;
   receiving and storing a received signal from receiving antennas, the received signal being the measurement signal changed based on a surrounding environment;
   measuring wireless channels for each of the transmission antennas and wireless channels for each of the receiving antennas based on the received signal;
   calculating a correlation for each transmission antenna based on the wireless channels for each of the transmission antennas; and
   calculating a correlation for each receiving antenna based on the wireless channels for each of the receiving antennas,
   wherein the calculating of the correlation for each of the multiple transmission antennas comprises:
   searching a maximum peak value from a channel impulse response of any one of the wireless channels for each of the transmission antennas, the channel impulse response being transmitted from an identical transmission antenna;
   retrieving a delay value corresponding to the maximum peak value;
   gathering channel coefficients having an identical delay value in each of the wireless channels; and
   calculating a transmission antenna correlation value based on the channel coefficients.

14. A multiple antenna correlation measurement method, comprising:
   setting an antenna parameter, a bandwidth, and a measurement frequency of each of a transmitter and a receiver;
   generating a measurement signal for channel measurement;
   sequentially broadcasting the measurement signal through transmission antennas;
   receiving and storing a received signal from receiving antennas, the received signal being the measurement signal changed based on a surrounding environment;
   measuring wireless channels for each of the transmission antennas and wireless channels for each of the receiving antennas based on the received signal;
   calculating a correlation for each transmission antenna based on the wireless channels for each of the transmission antennas; and
   calculating a correlation for each receiving antenna based on the wireless channels for each of the receiving antennas,
   wherein the calculating of the correlation for each of the multiple receiving antennas comprises:
   searching a maximum peak value from a channel impulse response of any one of the wireless channels for each of the receiving antennas, the channel impulse response being received from an identical receiving antenna;
   retrieving a delay value corresponding to the maximum peak value;
   gathering channel coefficients having an identical delay value in each of the wireless channels; and
   calculating a receiving antenna correlation value based on the channel coefficients.

* * * * *